(12) United States Patent
Higgins et al.

(10) Patent No.: US 12,293,076 B2
(45) Date of Patent: **\*May 6, 2025**

(54) HIGH-COMPRESSION, HIGH-VOLUME DEDUPLICATION CACHE

(71) Applicant: MORGAN STANLEY SERVICES GROUP INC., New York, NY (US)

(72) Inventors: Luke A. Higgins, Silver Spring, MD (US); Robert R. Bruno, Columbia, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/871,972

(22) Filed: Jul. 24, 2022

(65) Prior Publication Data
US 2023/0124863 A1 Apr. 20, 2023

Related U.S. Application Data

(63) Continuation-in-part of application No. 17/502,898, filed on Oct. 15, 2021, now Pat. No. 11,422,977.

(51) Int. Cl.
| | |
|---|---|
| *G06F 3/00* | (2006.01) |
| *G06F 3/06* | (2006.01) |
| *G06F 12/00* | (2006.01) |
| *G06F 12/084* | (2016.01) |

(52) U.S. Cl.
CPC .......... *G06F 3/0608* (2013.01); *G06F 3/0641* (2013.01); *G06F 3/0673* (2013.01); *G06F 12/084* (2013.01); *G06F 2212/62* (2013.01)

(58) Field of Classification Search
CPC .......................... G06F 12/1408; G06F 12/0292
USPC ........................................... 711/163
See application file for complete search history.

(56) References Cited

U.S. PATENT DOCUMENTS

| | | |
|---|---|---|
| 5,563,946 A | 10/1996 | Cooper |
| 5,598,470 A | 1/1997 | Cooper |
| 5,689,560 A | 11/1997 | Cooper |
| 5,737,416 A | 4/1998 | Cooper |
| 5,757,907 A | 5/1998 | Cooper |
| 7,891,012 B1 * | 2/2011 | Kiel ..................... G06F 21/554 713/176 |
| 8,089,861 B1 | 1/2012 | Rahim |

(Continued)

*Primary Examiner* — Sheng Jen Tsai
(74) *Attorney, Agent, or Firm* — Weitzman Law Offices, LLC (57) ABSTRACT

A method for caching and deduplicating a plurality of received segments of data is disclosed. The method comprises identifying a value of a first data field in each segment acting as a unique source identifier; and identifying a value of a second data field in each segment, the second data field being densely populated by values in the plurality of segments. The value of the second data field is partitioned into a first partition comprising more significant bits and a second partition comprising less significant bits. A key is generated based on values of the first data field and the first partition. A database entry associates the first key with a bitmap, the bitmap having a length based on the number of possible values a bitmap of equal length to the second partition could validly take. Single bits of the bitmap are set corresponding to received segments, to enable deduplication.

18 Claims, 4 Drawing Sheets

(56) References Cited

U.S. PATENT DOCUMENTS

| | | | | |
|---|---|---|---|---|
| 8,563,048 | B2* | 10/2013 | Magee | A61P 17/16 |
| | | | | 424/401 |
| 8,832,045 | B2 | 9/2014 | Dodd | |
| 9,367,557 | B1* | 6/2016 | Lin | G06F 16/1744 |
| 11,120,032 | B1* | 9/2021 | Chen | G06F 16/24549 |
| 11,422,977 | B1* | 8/2022 | Higgins | G06F 16/1748 |
| 11,995,050 | B2* | 5/2024 | Ponnala | G06F 16/215 |
| 2005/0125383 | A1 | 6/2005 | Gilfix | |
| 2005/0126383 | A1* | 6/2005 | Nagai | F15B 21/042 |
| | | | | 91/415 |
| 2006/0168451 | A1 | 7/2006 | Shi | |
| 2006/0188454 | A1* | 8/2006 | Corcoran | A61Q 11/00 |
| | | | | 15/4 |
| 2010/0200468 | A1* | 8/2010 | Dana | C10G 1/02 |
| | | | | 196/46 |
| 2010/0290468 | A1 | 11/2010 | Lynam | |
| 2011/0246741 | A1 | 10/2011 | Raymond | |
| 2011/0246744 | A1* | 10/2011 | Kirscht | G06F 9/4406 |
| | | | | 711/E12.002 |
| 2012/0079009 | A1 | 3/2012 | Carter | |
| 2015/0128274 | A1 | 5/2015 | Giokas | |
| 2016/0301561 | A1* | 10/2016 | Petersen | G06F 11/3495 |
| 2017/0366457 | A1* | 12/2017 | Wang | H04L 45/54 |
| 2018/0128274 | A1* | 5/2018 | Wirth | F04D 29/053 |
| 2019/0132207 | A1 | 5/2019 | Nataraj | |
| 2019/0171624 | A1* | 6/2019 | Douglis | G06F 16/1744 |
| 2020/0057752 | A1 | 2/2020 | Tofano | |
| 2020/0250141 | A1 | 8/2020 | Liu | |
| 2020/0260141 | A1* | 8/2020 | Radloff | H04N 21/4786 |
| 2021/0034571 | A1* | 2/2021 | Bedadala | G06F 16/134 |
| 2021/0232707 | A1 | 7/2021 | Wilson | |
| 2022/0156233 | A1* | 5/2022 | Ponnala | G06F 16/24568 |

* cited by examiner

HIGH-COMPRESSION, HIGH-VOLUME DEDUPLICATION CACHE

CROSS REFERENCE TO RELATED APPLICATION

This application is a continuation-in-part of co-pending U.S. patent application Ser. No. 17/502,898, filed Oct. 15, 2021, and also titled "HIGH-COMPRESSION. HIGH-VOLUME DEDUPLICATION CACHE", which is hereby incorporated by reference in its entirety.

FIELD OF INVENTION

This disclosure relates to systems and methods for deduplication caches, and more specifically, to systems and methods for minimizing the space needed to cache a large number of files having a shared format and that enable a high level of compression to facilitate deduplication of millions or billions of files.

BACKGROUND

In the modern age of "Big Data," some computing systems are expected to operate on streams of inputs comprising billions of files, packets, or other segments of data per day, of which tens of millions of files may be distinct, and of which hundreds of millions of files may be duplicates of a previously seen file. If every file is independently stored until processing of that file is complete, or if every file is saved for possible future queries, astronomical quantities of storage may be required. An efficient cache is necessary to make the determination of whether a file is a duplicate—and therefore does not need to be repeatedly stored or processed at all—or if the file is not a duplicate, to store the file using as little space as possible while allowing future queries to detect duplicates of that file.

If there are structural similarities in the files to be stored, compression to fewer bits per file may be achieved by omitting or substituting invariant parts of an input before caching. If there are limited domains of possible values of fields in the files to be stored, compression to fewer bits may be accomplished by converting a variable part of an input to an analogous domain (such as storing a byte known to contain an alphanumeric character using only 6 bits instead of 8 bits). However, existing generalized compression schemes are not necessarily clever enough to determine automatically how to perform these conversions optimally for a given input flow of files, may make the cached files more difficult to index for fast queries, or may be too computationally expensive to reverse quickly during a query of the cache.

Thus, there are advantages to having a system that is capable of high-volume insertion and lookup tasks while also minimizing the amount of memory required per inserted item.

SUMMARY OF THE INVENTION

A system for caching and deduplicating a plurality of segments of data is disclosed. The system comprises at least one server having one or more processors, at least one database, and non-transitory memory. The non-transitory memory comprises instructions that, when executed by the one or more processors, cause the one or more processors to receive, at the server, a first segment of data from the plurality of segments of data. Next, they identify a value of a first data field in the first segment of data, the value of the first data field comprising a unique source identifier; and identify a value of a second data field in the first segment of data, the second data field being densely populated by values in the plurality of received segments of data. They partition the value of the second data field into a first partition comprising more significant bits and a second partition comprising less significant bits and generate a first key based on the value of the first data field and a value of the first partition. Next, they store, in the at least one database, an entry associating the first key with a bitmap, the bitmap having a length greater than or equal to a maximum number of possible values a bitmap of equal length to the second partition could validly take and set a single bit of the bitmap, corresponding to a value of the second partition, to true. When they receive, at the server, a second segment of data from the plurality of segments of data, they likewise generate a second key based on a value of the first data field in the second segment of data and a value of a first partition of the second data field in the second segment of data. Using the second key, they retrieve a bitmap associated with the second key. Finally, based on a set bit in the retrieved bitmap corresponding to a value of the second partition of the second data field of the second segment of data, they determine that the second segment of data had previously been received by the server.

Similarly, a computer-implemented method for caching and deduplicating a plurality of segments of data is disclosed. The method comprises receiving a first segment of data from the plurality of segments of data; identifying a value of a first data field in the first segment of data, the value of the first data field comprising a unique source identifier; identifying a value of a second data field in the first segment of data, the second data field being densely populated by values in the plurality of received segments of data; partitioning the value of the second data field into a first partition comprising more significant bits and a second partition comprising less significant bits; generating a first key based on the value of the first data field and a value of the first partition; storing, in a database, an entry associating the first key with a bitmap, the bitmap having a length greater than or equal to a maximum number of possible values a bitmap of equal length to the second partition could validly take; setting a single bit of the bitmap, corresponding to a value of the second partition, to true; receiving a second segment of data from the plurality of segments of data; likewise generating a second key based on a value of the first data field in the second segment of data and a value of a first partition of the second data field in the second segment of data; retrieving a bitmap associated with the second key; and based on a set bit in the retrieved bitmap corresponding to a value of the second partition of the second data field of the second segment of data, determining that the second segment of data had previously been received.

Additional features include variations of the above system and method where timestamps are used to augment the keys and facilitate dropping of outdated cache entries, where the length of the bitmap is adaptive and variable, and where various design choices have been made specifically to optimize the storing and deduplication of operating system event logs.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

In order to allow for caching a massive number of files or segments of data being streamed to a system for storage or further analysis, a data structure is provided along with methods for storing and querying the data structure. This data structure can, for certain types of data or use cases, achieve a high level of compression with no risk of a false positive determination that a new file or segment of data has already been seen.

The ideal form of data for caching via this structure is one that combines a first data field storing a discrete identifier that is intended to be unique with a second data field that, over the set of all data entries associated with a given value in the first data field, is expected to be densely filled by distinct values from the possible range of values for that field (e.g., if a field can only accept N possible values because ($\log_2 N$) bits are used to represent it, it is expected to see at least a predetermined minimum number of distinct values associated with each value in the first data field, such as 0.5N, or 0.75N, or 0.99N). In a most preferred embodiment, the dense filling is accomplished by means of or is the result of an incrementing counter, though sparser fillings may still permit a data structure to take advantage of repeated data.

In many embodiments, the cached data includes a third data field for a timestamp may be used to facilitate partitioning of stored data on the basis of date as well as making it much easier to cycle out stale data by dropping partitions that are older than a certain threshold, such as one month, one week, or one day.

For example, a system may wish to cache every operating system event log entry from hundreds or thousands of computers over a period of time. In the Windows® operating system, an event log typically includes the unique identifier of the specific machine running the operating system, a timestamp of the logged event, an incrementing integer identifier for the logged event, and some text or other data describing the logged event. The incrementing integer identifier starts at 1 and increases over a period of hours or days as logged events occur, until the counter reaches $2^{32}-1$, the maximum 32-bit integer size. At this point, the identifier loops back to 1 and continues incrementing.

In other use cases, forms of data other than operating system event logs may be cached for future analysis. In a networking context, a system may be configured to store every packet sent over a network, with the source or destination of the packet being a unique identifier, and an incrementing counter (especially in a TCP packet or other stateful protocol) being used within each packet to sequence and distinguish them from one another. In a biomedical context, countless individuals' wearable devices or medical apparatuses might constantly or periodically log biometric data, such as the data from an EKG or other sensor probe every second, blood pressure sensed for every heartbeat, volume or duration of every breath, etc. In a meteorological context, countless remote devices might constantly or periodically send records of the current temperature, air pressure, or other captured physical data via sensors. The deduplication process described below may be generalized to many different contexts where the sheer volume of the data being processed makes avoiding any wasted computing time or memory allocation of critical importance.

A marked increase in compression rate can be achieved when the data structure takes advantage of density in the population of one data field to group sets of cached items under a single header (as depicted below in FIGS. 3 and 4) rather than repeat a same portion of header for every single cached item. As a result, total required memory has been experimentally shown to decrease by two to three orders of magnitude when caching operating system event logs, compared to a traditional hash table storing the same data.

Figure 1:
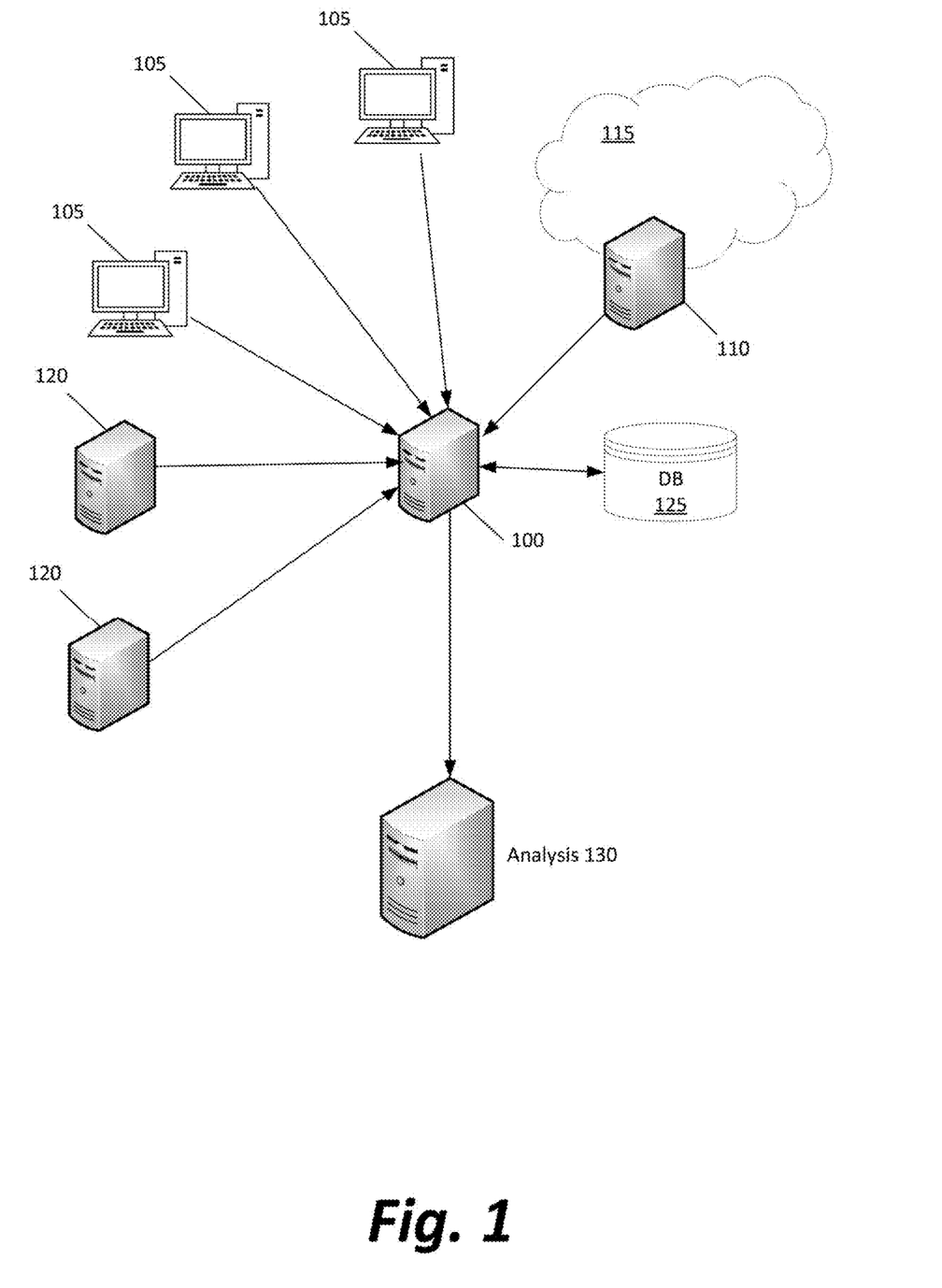
FIG. 1 illustrates, in simplified form, a system of computing devices used to capture a stream of input data segments and cache them for subsequent lookup.

FIG. 1 illustrates, in simplified form, a system of computing devices used to capture a stream of inputs and cache them for subsequent lookup.

A central server 100 acts as a repository for data from some external source or sources and performs a deduplication check on incoming data, according to a method described further below in relation to the description of FIGS. 2-4.

In the preferred embodiment already described, the data may be operating system event logs generated during the use of various personal computers 105. In other embodiments, the data may be packet data captured by various network taps 110 on an associated network 115, or various data captured by other computing devices 120 (such as meteorological or biometric data, as described above).

The server 100 uses one or more databases 125 to store a cache that is continually updated as files are received, tracking that a file has been seen and ensuring that it will be marked as a duplicate the next time it is encountered.

After receiving a file and determining that it is not a duplicate, the server 100 may forward the file to some sort of external analysis system 130 that, depending on the use case, analyzes and acts upon the file in some way, such as incorporating the file's information into a data model, performing malware analysis or otherwise identifying an anomaly based on the content of the file, or any other action that benefits from having the file's information available. As a result of deduplication performed at the server 100, the external analysis system 130 is not overwhelmed and computing power wasted on duplicate files that have already been processed.

Although a particular division of functions between devices is described with relation to the systems depicted in FIG. 1, above, other configurations are possible in which functions are divided among devices differently. For example, all of the functions of some or all of the server 100, the database 125, the network taps 110 or other computing devices 120, and the external analysis system 130 may be performed by a single device with multiple threads executing different software modules simultaneously.

Alternatively, the server 100, the database 125, and/or the external analysis system 130 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Figure 2:
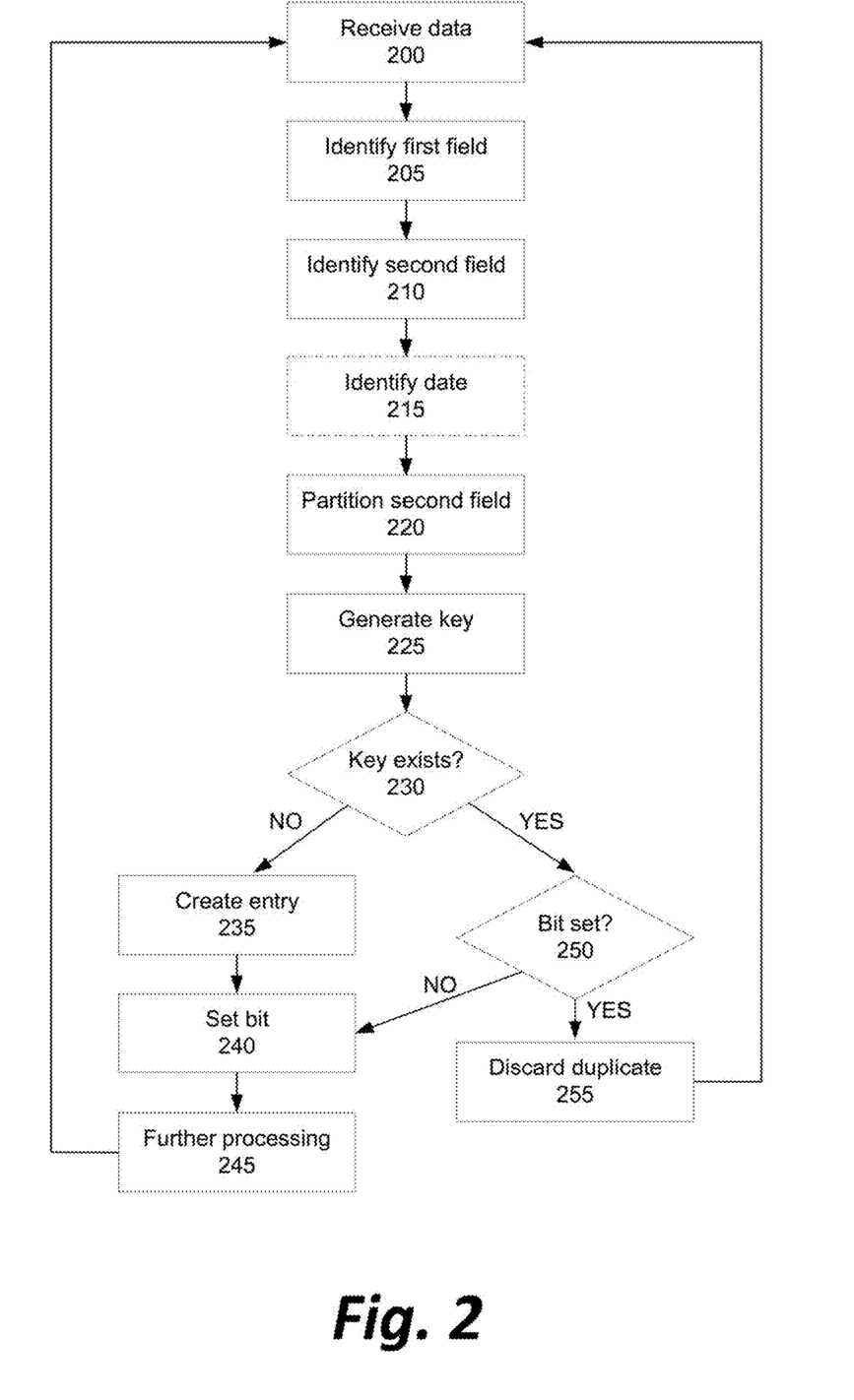
FIG. 2 illustrates, in simplified form, a caching and deduplication method for files, packets, logs, or other segments of data having a particular input format known in advance.

FIG. 2 illustrates, in simplified form, a caching and deduplication method for files, packets, logs, or other segments of data having a particular input format known in advance.

Initially, the server 100 receives a segment of data (Step 200). As previously mentioned, this segment of data may be an event log, a packet, a file, a sensor reading, or any other form of data that is divided up into discrete portions.

The server identifies a first data field in the segment of data that includes a unique source identifier (Step 205). In the operating system event log context, this can be the hostname of the machine that generated the event log. In other contexts, it may be a unique network address, identifier of a human individual, identifier of a particular location of a weather sensor, etc.

The server identifies a second data field that is generally densely populated by values in various received segments of data (Step 210). As mentioned above, this may be an autoincrementing counter used by the data source, so that ultimately, given enough time, every possible integer up to the maximum storable integer in the data field would be used and associated with each unique identifier. Each computer generating operating system event logs will ultimately generate logs associated with that computer's hostname and having every possible value for the record number from 1 to $2^{32}-1$. Autoincrementing counters may be used in other contexts, or alternatively, if a data source is performing a sensor reading every second, a timestamp that includes the exact time of the sensor reading might ultimately act as an incrementing counter.

The server may identify the date indicated in a timestamp in a segment of data (Step 215), if it did not already do so in the previous step. This serves two potential purposes. First, if the nature of the data is such that it can become "stale" and no longer of relevance to the external analysis system 130, then the data may be identified as already stale at the time the server 100 receives it, and can be discarded even before performing a deduplication check. Second, for not-yet-stale data, the date can be incorporated into a storage key to make it easier to drop the data from the database 125 when it does become stale. In a preferred embodiment, the extracted date is converted to a consistent format such as "MMDDYYYY".

Next, the value of the second data field is partitioned into a first partition comprising more significant bits and a second partition comprising less significant bits (Step 220). In a preferred embodiment, the first partition is converted into a string representing the set of bits in hexadecimal. In the operating system event log context, the 32 bits are preferably divided into the 20 most significant bits and the 12 least significant bits. Thus, the record number 4026531841 (0xF0000001), might be partitioned into "F0000" and "001". Different divisions of bits into the first and second partition may be used, so long as they, in combination, make up the entirety of the bits of the second data field.

The server generates a key for the data based on the value of the first data field, on the value of the first partition, and optionally on the timestamp (Step 225). In a preferred embodiment, these values are simply concatenated together in some predetermined, consistent order, with delimiters between them. For example, an event log with the timestamp "7/30/2021 22:34:08", the host machine name "machine1.domain", and record number 4026531841 (0xF0000001), partitioned into "F0000" and "001", might result in a key "machine1.domain-07302021-F0000".

In an alternative embodiment, rather than simply concatenating the value of the first data field (the source identifier) with the first partition, the value of the first data field may be transformed in some way that is still intended to preserve its uniqueness. If hostnames or other source identifiers are excessively lengthy and will require many bytes of storage for information that is shared among sources, they may be truncated to remove that shared information (for example, truncating to "machine1" and "machine2" instead of "machine1.domain.com" and "machine2.domain.com"). Cryptographic hash functions may be used to reduce a much longer name to a fixed size, such as 16 bytes via MD5 or 32 bytes via SHA-256, while only very slightly increasing the risk of a key collision from two different source identifiers hashing to the same value. Modular arithmetic may be used to reduce an integer representation of a source identifier to a value between 0 and the modulus chosen. Any other transformation that truncates, abridges, or maps source identifiers to a shorter value or smaller domain while trying to preserve a one-to-one relationship of inputs and outputs might be used to obtain shorter keys than would otherwise be possible when using a raw source identifier.

After the key is generated, the server 100 checks the database 125 to determine whether an entry with that key already exists (Step 230).

If an entry does not, the entry is created with that key in the database 125 (Step 235). The entry associates the key with a bitmap, the bitmap having a maximum length greater than or equal to a maximum number of possible values a bitmap of equal length to the second partition could validly take (i.e., if 12 bits are associated with the second partition, the second partition can take on $2^{12}$ possible values, so the bitmap is $2^{12}$ bits long.

In some database structures, it may be possible to have the bitmap have a variable length rather than a pre-assigned length, such that the maximum length of the bitmap is $2^{12}$ bits long, but the actual stored length is no longer than the greatest value seen for the second partition thus far. As a result, if "001" were the second partition, the bitmap might initially be only a single bit long, while if "010" were the second partition, the bitmap would initially be 16 bits long, with 15 zeroes being followed by a one.

A single bit of the bitmap is set to true, corresponding to the value of the second partition (Step 240). For example, if the key "machine1.domain-07302021-F0000" is created after partitioning of "0xF0000001" into "F0000" and "001", the first bit (corresponding to "001") of the bitmap is set. After setting the bit, the data is transmitted to the external analysis system 130 or otherwise queued for later processing (Step 245), and the server checks for the next received data (back to Step 200).

If an entry did already exist with that key, the associated bitmap is retrieved, and the bit corresponding to the value of the second partition is checked (Step 250).

If it is affirmatively set to true, the data is discarded as being a duplicate (Step 255) and the server checks for the next received data (back to Step 200).

If the bit is set to false, or if the language or data structure used allow for unset or null bits, the data is not previously seen, and accordingly, the bit is set to show that the file now has been seen (Step 240), the data is transmitted to the external analysis system 130 or otherwise queued for later processing (Step 245), and the server checks for the next received data (back to Step 200).

Figure 3:
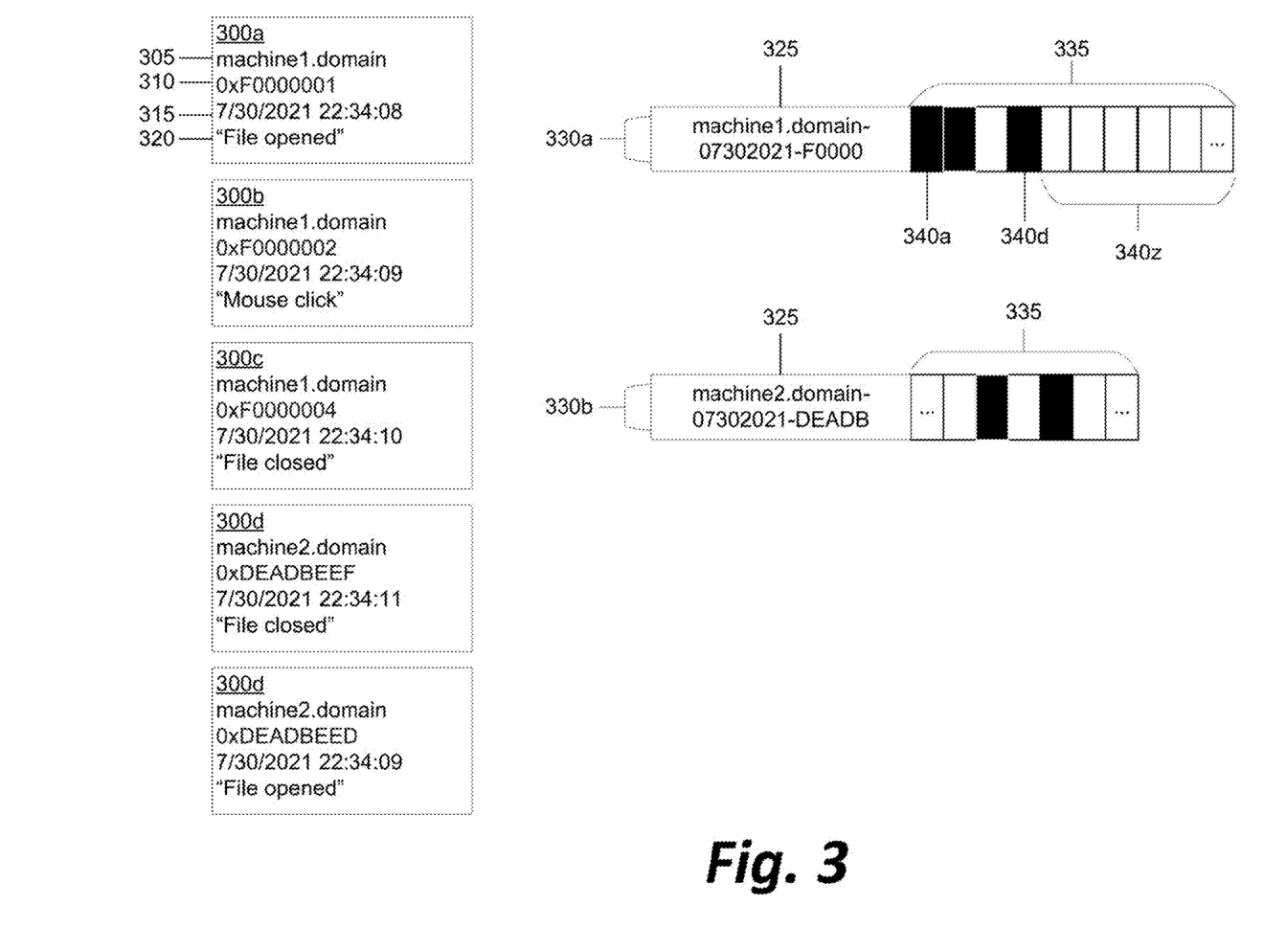
FIG. 3 illustrates how a set of operating system event logs may be consolidated in a cache with a significant decrease in memory usage, according to the method illustrated by FIG. 2.

FIG. 3 illustrates how a set of operating system event logs may be consolidated in a cache with a significant decrease in memory usage, according to the method illustrated by FIG. 2.

The server 100 might receive a series of operating system event logs 300*a*-300*e*, each including the first data field 305 (the hostname), the second data field 310 (the record number), the date 315, and some payload 320 that is not cached.

As already described above, these values are used to generate a number of keys 325, to be used to index database entries 330 that associate each key 325 with a bitmap 335. The three logs 300*a*, 300*b*, and 300*c* are denoted by three bits (including 340*a* and 340*d*) that are set in the bitmap 335. Additional bits 340*z* may be part of the bitmap if the length of the bitmap is fixed by the database allocation, or may be absent if the database is instead storing the bitmap as a variable-length binary large object (BLOB) or another variable-length format.

Note that even though the data in the keys appears multiple times in the logs 300, the actual key data only appears once in the database. As saturation of the bitmaps 335 increases, the efficiency of this data structure also increases, since the key is only repeated once, and each additional entry using that key only adds one bit that needs to be stored. If bitmaps are being generated that are mostly zeroes, this indicates a potential savings by increasing the size of the first partition and decreasing the size of the bitmaps, until saturation is achieved. Note also that depending on the location of the set bits, such as the bits in record 330*b* at positions for "EEF" and "EED", there may be a large number of zero bits that need to be initialized before the set bits even in a variable length scheme. However, the use of an autoincrementing counter greatly reduces the likelihood that this will occur.

In addition to fine tuning before data entry how many bits to partition into the first and second partitions, the data structure could, in some embodiments, be flexible, combining two keys' bitmaps at runtime if the saturation of their bitmaps is high, and separating the bitmap associated with a particular key into two or more smaller bitmaps with a longer key if saturation is low, always adapting so that the fewest bits are actually used to represent a particular set of inputs.

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 4, below, describes various enabling devices and technologies related to the physical components and architectures described above.

Figure 4:
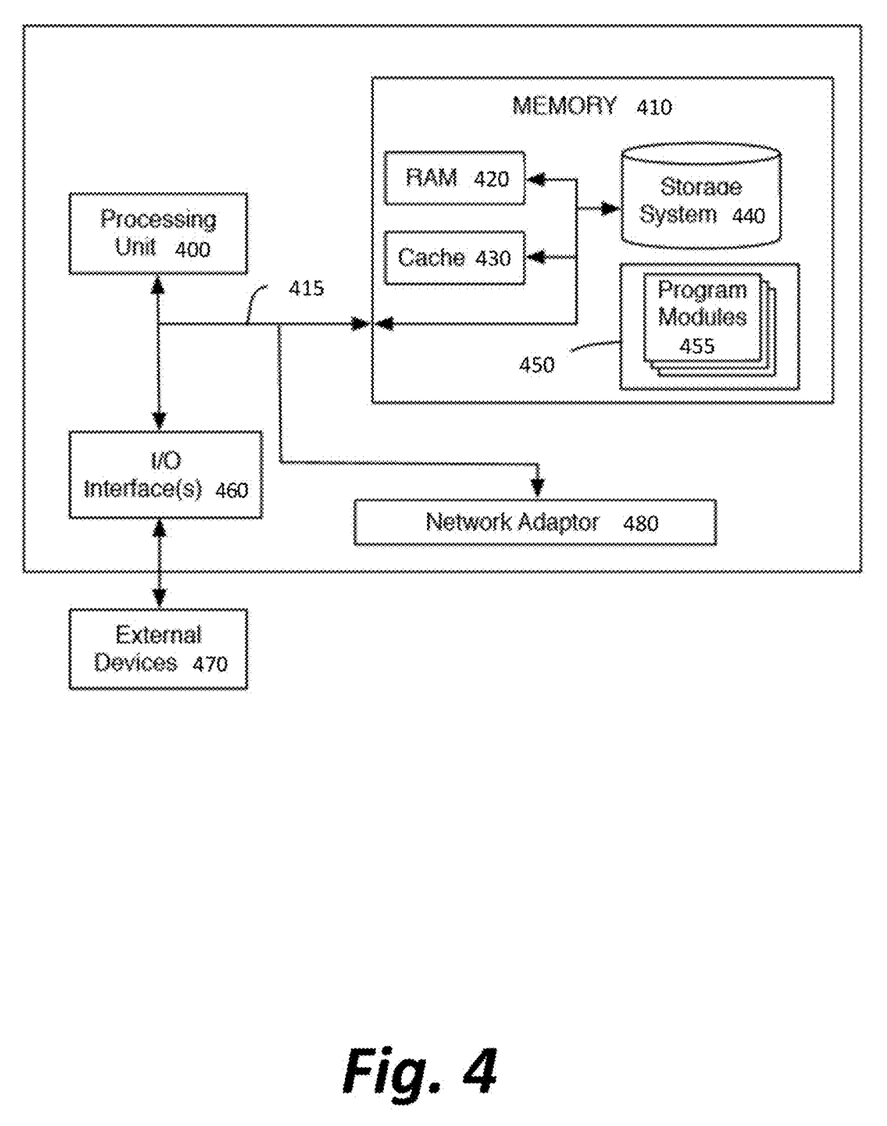
FIG. 4 is a high-level block diagram of a representative computing device that may be utilized to implement various features and processes described herein.

FIG. 4 is a high-level block diagram of a representative computing device that may be utilized to implement various features and processes described herein, for example, the functionality of the client computing device 100, personal computers 105, network taps 110, database 125, external analysis system 130, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 4, the computing device is illustrated in the form of a special purpose computer system. The components of the computing device may include (but are not limited to) one or more processors or processing units 400, a system memory 410, and a bus 415 that couples various system components including memory 410 to processor 400.

Bus 415 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 400 may execute computer programs stored in memory 410. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 400 may be used.

The computing device typically includes a variety of computer system readable media. Such media may be any available media that is accessible by the computing device, and it includes both volatile and non-volatile media, removable and non-removable media.

System memory 410 can include computer system readable media in the form of volatile memory, such as random access memory (RAM) 420 and/or cache memory 430. The computing device may further include other removable/non-removable, volatile/non-volatile computer system storage media. By way of example only, storage system 440 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces. As will be further depicted and described below, memory 410 may include at least one program product having a set (e.g., at least one) of program modules that are configured to carry out the functions of embodiments described in this disclosure.

Program/utility 450, having a set (at least one) of program modules 455, may be stored in memory 410 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 470 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 460.

In addition, as described above, the computing device can communicate with one or more networks, such as a local area network (LAN), a general wide area network (WAN) and/or a public network (e.g., the Internet) via network adaptor 480. As depicted, network adaptor 480 communicates with other components of the computing device via bus 415. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for caching and deduplicating a plurality of segments of data, comprising:
    at least one server having one or more processors;
    at least one database; and
    non-transitory memory comprising instructions that, when executed by the one or more processors, cause the one or more processors to:
        receive, at the server, a first segment of data from the plurality of segments of data;
        identify a value of a first data field in the first segment of data, the value of the first data field comprising a unique source identifier;
        perform a transformation on the value of the first data field to obtain a transformed source identifier;
        identify a value of a second data field in the first segment of data, the second data field being densely populated by values in the plurality of received segments of data;
        partition the value of the second data field into a first partition comprising more significant bits and a second partition comprising less significant bits;
        generate a first key based on the transformed source identifier and the first partition comprising more significant bits;
        store, in the at least one database, an entry associating the first key with a bitmap, the bitmap having a maximum length equal to a maximum number of possible values a bitmap of equal length to the second partition could validly take;
        set a single bit of the bitmap, corresponding to a value of the second partition, to true;
        receive, at the server, a second segment of data from the plurality of segments of data;
        likewise generate a second key based on a transformed source identifier in the second segment of data and a value of a first partition of the second data field in the second segment of data;
        retrieve a bitmap associated with the second key; and
        based on a set bit in the retrieved bitmap corresponding to a value of the second partition of the second data field of the second segment of data, determine that the second segment of data had previously been received by the server.

2. The system of claim 1, wherein the non-transitory memory comprises instructions that, when executed by the one or more processors, further cause the one or more processors to:
    receive, at the server, a third segment of data from the plurality of segments of data;
    generate a third key;
    retrieve a bitmap associated with the third key; and
    based on an unset bit in the retrieved bitmap corresponding to a value of the second partition of the second data field of the third segment of data, determine that the third segment of data had not previously been received by the server.

3. The system of claim 1, wherein the non-transitory memory comprises instructions that, when executed by the one or more processors, further cause the one or more processors to:
    identify a portion of entries stored in the at least one database having an age greater than a predetermined threshold; and
    drop the identified portion of entries from the at least one database.

4. The system of claim 3, wherein the portion of entries is identified based on at least a portion of a timestamp included in the key of each entry in the portion of entries.

5. The system of claim 1, wherein the second data field comprises values generated by an incrementing counter.

6. The system of claim 1, wherein the first and second keys further comprise at least a portion of a timestamp.

7. The system of claim 1, wherein the first and second keys comprise a concatenation of strings, the strings comprising at least transformed source identifier and the first partition of the second data field.

8. The system of claim 7, wherein the strings further comprise at least a portion of a timestamp.

9. The system of claim 1, wherein the bitmap has an adaptive length depending on values previously encountered for the second partition.

10. A computer-implemented method for caching and deduplicating a plurality of segments of data, comprising:
    receiving a first segment of data from the plurality of segments of data;
    identifying a value of a first data field in the first segment of data, the value of the first data field comprising a unique source identifier;
    performing a transformation on the value of the first data field to obtain a transformed source identifier;
    identifying a value of a second data field in the first segment of data, the second data field being densely populated by values in the plurality of received segments of data;
    partitioning the value of the second data field into a first partition comprising more significant bits and a second partition comprising less significant bits;
    generating a first key based on the transformed source identifier and the first partition comprising more significant bits;
    storing, in a database, an entry associating the first key with a bitmap, the bitmap having a maximum length equal to a maximum number of possible values a bitmap of equal length to the second partition could validly take;
    setting a single bit of the bitmap, corresponding to a value of the second partition, to true;
    receiving a second segment of data from the plurality of segments of data;

likewise generating a second key based on a transformed source identifier from the first data field in the second segment of data and a value of a first partition of the second data field in the second segment of data;

retrieving a bitmap associated with the second key; and based on a set bit in the retrieved bitmap corresponding to a value of the second partition of the second data field of the second segment of data, determining that the second segment of data had previously been received.

11. The method of claim 10, wherein the non-transitory memory comprises instructions that, when executed by the one or more processors, further cause the one or more processors to:

receive, at the server, a third segment of data from the plurality of segments of data;

generate a third key;

retrieve a bitmap associated with the third key; and based on an unset bit in the retrieved bitmap corresponding to a value of the second partition of the second data field of the third segment of data, determine that the third segment of data had not previously been received by the server.

12. The method of claim 10, wherein the non-transitory memory comprises instructions that, when executed by the one or more processors, further cause the one or more processors to:

identify a portion of entries stored in the at least one database having an age greater than a predetermined threshold; and drop the identified portion of entries from the at least one database.

13. The method of claim 12, wherein the portion of entries is identified based on at least a portion of a timestamp included in the key of each entry in the portion of entries.

14. The method of claim 10, wherein the second data field comprises values generated by an incrementing counter.

15. The method of claim 10, wherein the first and second keys further comprise at least a portion of a timestamp.

16. The method of claim 10, wherein the first and second keys comprise a concatenation of strings, the strings comprising at least a transformed source identifier and a first partition of the second data field.

17. The method of claim 16, wherein the strings further comprise at least a portion of a timestamp.

18. The method of claim 10, wherein the bitmap has an adaptive length depending on values previously encountered for the second partition.

\* \* \* \* \*